2,716,598
Patented Aug. 30, 1955

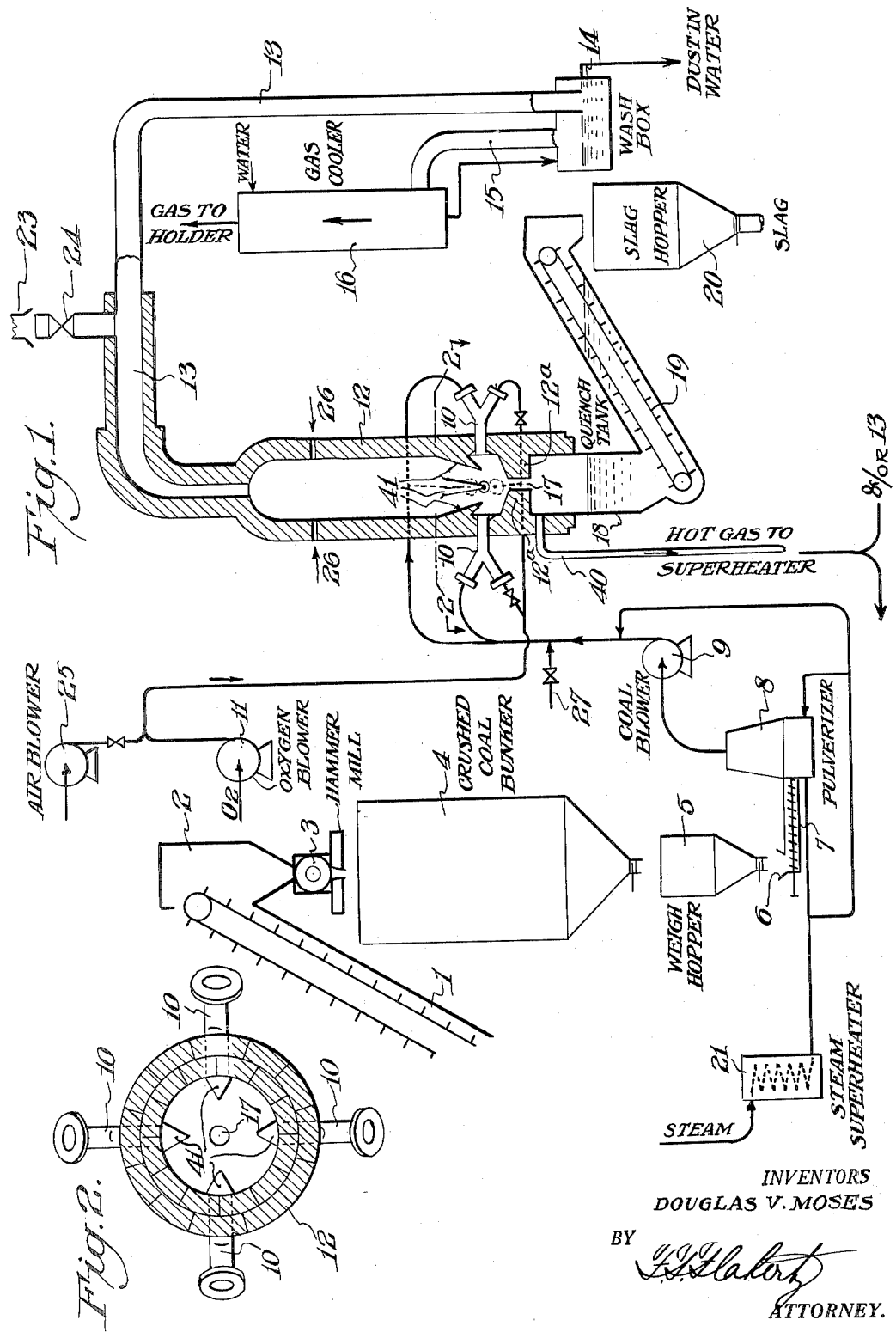

United States Patent Office 2,716,598

PREPARATION OF CARBON MONOXIDE AND HYDROGEN BY PARTIAL OXIDATION OF CARBONACEOUS SOLIDS

Douglas V. Moses, Charleston, W. Va., assignor to E. I. du Pont de Nemours and Company, Wilmington, Del., a corporation of Delaware Application February 6, 1951, Serial No. 209,593

5 Claims. (Cl. 48—206)

This invention relates to a process for the preparation of carbon monoxide and hydrogen by at least partial oxidation of comminuted solid carbonaceous materials, and is more particularly directed to the preparation of hydrogen, gaseous mixtures containing hydrogen and nitrogen and gaseous mixtures containing hydrogen and carbon monoxide, by the partial oxidation of powdered coal.

In pending applications of Peery et al., S. N. 58,212, S. N. 134,034 and S. N. 165,078, are described processes and apparatus for the partial oxidation of coal with oxygen of at least 90% purity, these applications covering, inter alia, and respectively, the preparation of synthesis gas by partial combustion of coal with oxygen and steam; process for preparing synthesis gas from pulverized coal, steam and oxygen in which molten slag is removed through a liquid seal and a process for preparing carbon monoxide and hydrogen by the partial oxidation of carbonaceous material in the presence of steam and highly concentrated oxygen. This invention is directed to a process for improving the operation of such processes.

An object of the present invention is to provide an improved process for the preparation of synthesis gas mixtures from coal. Another object is to provide a process for the preparation of gases containing principally hydrogen, carbon monoxide and hydrogen, or hydrogen and nitrogen, wherein the purity and/or the ratio of constituents can be accurately controlled. A further object is to provide a process for the partial combustion of solid carbonaceous fuels, such as powdered coal, by a simple and highly efficient process. Yet another object is to provide a method of conducting such processes sealed from the atmosphere. Other objects and advantages of the invention will hereinafter appear and will be more fully understood by reference to the specification and to the accompanying drawing which diagrammatically illustrates a preferred form and assemblage of apparatus in which the reaction takes place.

The invention is directed principally to an improved method of discharging slag from the generators of processes such as those described in applications S. N. 58,212, S. N. 134,034 and S. N. 165,078, from the generators of the process described hereinafter and from the generators of related processes. One of the outstanding difficulties encountered in the partial combustion of pulverized coal is the discharge of the molten slag from the generator. In units described in the arts to investigate the process, little, if any, attention has been given to this feature, the molten slag being intermittently discharged from some manually operated opening provided in the bottom of the generator, some rodding or hoeing method being used to withdraw the slag. The discharging means, necessarily of a temporary nature, were given little serious attention, principal effort being expended in this involved problem on its chemical and economical aspects. However, for commercial adaptation of the process, the discharge of molten slag involves a serious problem principally because the slag is discharged generally at about its freezing point and must be removed before solidification. Moreover, if the tapping hole through which the slag is dropped is relatively large, product gases will likewise be discharged via the same route and be lost through the mechanism used in removing the slag and/or the product gases be contaminated with air seeping into the generator.

The invention of this application relates, inter alia, to an improved method of slag removal whereby the slag is maintained in a free-flowing state until it has been discharged from the generator. This advantageous result is provided by a critical control of the intense heat of the reaction in proximity to the slag and the hearth which discharges the slag from the generator.

The apparatus illustrated in the drawing is a preferred embodiment of the invention. It is used for the thermal partial decomposition by oxidation of hydrocarbonaceous solids generally and coal more particularly.

Fig. I is a partly schematic elevation of an apparatus in which my process can be effected.

Fig. II is a sectional view taken along line 2—2 in Fig. I.

Fig. I illustrates the apparatus in which the process of the invention is carried out and in which coal is pulverized, then suspended in superheated steam, which suspension is thoroughly mixed with oxygen, or oxygen fortified air, and the resulting mixture subjected to partial combustion. The gaseous products are separated from the slag and ash produced during the partial combustion of the powdered coal, and then are treated for the preparation of a gas of hydrogen, of hydrogen and carbon monoxide, or of hydrogen and nitrogen, or related gas mixtures. Essentially all of the ash content of the coal is removed from the furnace as liquid slag. The series of operations illustrated provide an overall continuous process for producing a highly efficient and economical conversion of the volatile matter and fixed carbon in coal, its oxidation products, together with decomposition products of steam, to synthesis gas mixtures.

In Fig. I, conveyer 1 transports coal into hopper 2 of a hammer mill 3 wherein any lumps of coal are crushed. From hammer mill 3 the crushed coal drops into bunker 4, from the bottom of which in turn the crushed coal is fed by gravity to weighing hopper 5 and into the metering device 6 with screw feed 7, which forces a measured portion of the crushed coal into a steam pulverizer 8 wherein the crushed coal is comminuted and the product picked up by steam which transports it as a steam-coal fluid stream impelled by blower 9 into the high velocity jet burners 10 which are directed in a substantially horizontal plane either axially toward the center of generator 12 or at an angle to give an upward swirling motion to the flame and product gases. If desired, the burners 10 can be directed slightly off the horizontal, the projection of the burners thereby forming a cone with the apex substantially at the center of the generator 12. Lips 41 are provided within generator 12 to deflect falling slag from burner apertures. The coal-steam-oxygen mixture issues from burner 10 into gas generator 12 in which the mixture of gases is ignited. The gaseous products of ignition flow from gas generator 12 through conduit 13 to wash box 14, the washed gases issuing from wash box 14 through conduit 15 and gas cooler 16 to a suitable gas holder not shown. The slag produced in gas generator 12 flows through a tapping hole 17 provided in the bottom of the gas generator 12 and drops into the water held in quench tank 18. The tapping hole 17 may, if desired, be located in the wall at the side rather than at the bottom of the generator 12 as shown, and may vary between about $\frac{1}{50}$ to $\frac{1}{100}$ of the furnace cross-section. The port of the tapping hole 17 is kept hot and free of slag plugs by, inter alia, withdrawing from about 10 to 25% of the product gas through this port. This hot gas may, if desired, be passed through the steam superheater 21 to preheat the entering steam and/or returned to the main product gas stream via an auxiliary blower not shown. From the bottom of quench tank 18 the slag is lifted by means of conveyer 19 to slag hopper 20. Steam is introduced into the system from superheater 21 from which it is passed into the pulverizer 8 and, if desired, may be introduced into the steam entrained coal after it passes blower 9. Cooling water is sprayed into the generator gases at 22 prior to passing them into the wash box 14. A flare stack 23 and valve 24 are provided for discharge of the gases produced during start-up, shut-down or control during periods of unsteady operation.

The hammer mill is adjusted to crush the lump coal to a size of ¼″ or less, and this crushed coal is then dropped into the pulverizer 8 wherein it is ground to a product approximately 90% or more of which will pass through a 200 mesh U. S. standard screen. Any suitable type of mechanical pulverization may be used. The known commercial steam jet type pulverizers are especially well adapted for this particular operation because the pulverized coal, after grinding, is entrained in steam substantially at one and the same time, and passed from the pulverizer as a steam-coal fluid mixture, the coal being suspended by a sufficient quantity of steam flowing at a sufficient velocity to carry the coal to the burner.

One manner of removing the slag from converter 12 is illustrated in Figure I. In the apparatus illustrated by this figure the slag falls by gravity through tapping hole 17 into a liquid, which may be water or any other suitable quenching medium, in quench tank 18. The molten slag, as it is quenched in the liquid, solidifies and is picked up by the conveyer 19 and discharged into the slag hopper 20.

Continuous flow of slag through tapping hole 17 is essential to successful operation of the process. Without some means of maintaining the slag fluid to insure continuous flow of the molten slag into and through conduit 13, plugging of the apparatus may result. With many types of coal the temperature of the slag, as it collects in the bottom of generator 12, is close to its freezing point and there is a tendency to plug even with a slight lowering in temperature resulting from the heat lost by radiation to the quenching medium. Plugging, however, is avoided by maintaining the slag in a free-flowing condition by the intense temperature created by the opposed flames colliding in the center of the generator. The heat from radiation and from direct contact with a portion of the combusting materials is sufficient to maintain adequate fluidity. It is necessary, however, that neither too much nor too little heat be supplied to maintain the slag in a free flowing state. Direct impingement of the high temperature flame against the slag, especially if the flame contains appreciable amounts of uncombined oxygen at the point of impingement, results in rapid erosion of the hearth 12a. On the other hand, flame temperature must be high enough to maintain a free flowing slag. By positioning the burners as described and thereby exposing the slag to radiant heat from the impinging flames, and only contact of the slag with the substantially oxygen free flame at the comparatively cool edge of the flame, provides a free flowing state with little or no erosion. Moreover, slag flow through tapping hole 17 is facilitated by passing a relatively small portion of the hot product gases through tapping hole 17. This also helps to maintain the slag passing through this aperture above its solidification temperature. The product gases may be removed from the free space above the quenching liquid and discharged into conduits 13, 15 or used for superheating steam or for any other desired purpose. Water, if used for quenching, is generally at its boiling point; considerable steam is formed and is withdrawn with the hot gases through the exit pipe 40.

To start the reaction, gas generator 12 and auxiliary piping are brought up to temperature by burning natural gas or other fuel introduced into the high velocity jet burner at 27. This fuel is mixed with oxygen or air and burned within the generator 12 until the generator reaches a uniform temperature of about 1000° C. to 1200° C. When this temperature has been attained, coal and steam are introduced into the fuel stream and the ratio of steam-coal suspension gradually increased over a period of about an hour, at the end of which time substantially all auxiliary fuel flow is cut off. Commencing operation in this manner minimizes explosion hazards in gas generator 12. During normal operation of the process, the temperature within the combustion zone is held above 1200° C. and preferably above 1400° C., the maximum temperature at the chamber wall being between 1300° and 1700° C., the temperature being adjusted, inter alia, by control of rates of oxygen and coal ingestion. Flash-back of the flame into the burner is avoided providing a high fluid velocity is maintained in the jet burners 10 at all times. This velocity should be at least 100 feet per second for nozzles having diameters up to ¾″ with velocities of at least 150 feet per second and preferably above 300 feet per second for larger nozzles. During the start-up period and after the interior temperature of the generator 12 has reached 1200° C. and the fuel is slowly replaced by the steam-coal mixture, a complete replacement is effected without hazardous flash-back difficulties, if the proper velocities are maintained.

The steam has a five-fold function to perform; first, to pulverize the coal in steam pulverizer; second, to transport the coal as an entrained stream from the pulverizer to the high velocity jet burner; third, to provide an incipient distillation of volatile material from the coal; fourth, to limit and control the reaction temperature; and fifth, to serve as a reactant in the process. It is essential that the coal-steam mixture be maintained after comminution above the dew point of its moisture content in order to prevent precipitation within the conduits leading to the high velocity jet burner. When operating at temperatures only slightly above the dew point, the optimum advantages of the process are not realized for it has been found that if the steam temperature is increased to a temperature above that at which incipient distillation of volatile materials from the coal occurs, this distillation facilitates ignition and subsequent partial combustion of the coal. As is well known, most bituminous coals reach a plastic state at a temperature of about 400° C., in which state the coal is quite sticky and difficult to transport without clogging of equipment. As a consequence, the steam-coal stream is preferably maintained at a temperature between 200 and 400° C., and preferably between 250 and 350° C.

To insure sufficient steam to carry the coal, the amount of steam should range between 0.5 to 1.5 pounds per pound of coal, depending to a large extent upon the height necessary to carry and to lift the coal from the pulverizer to the burner and on the resultant velocities in the transport lines. The steam supplied to the pulverizer should be under a pressure between 80 and 150 p. s. i. g., and preferably between 100 and 110 p. s. i. g., the blowers 9, 11 and 25 operating to deliver fluids at pressures between 1.0 and 5.0 p. s. i. g. Auxiliary steam in excess of pulverizer requirements may be supplied, if desired, at low pressure between 5 and 10 p. s. i. g.

The oxygen introduced into the burner should be of not appreciably less than 90% purity, preferably above 95% purity, and is used in sufficient amounts to give steam-oxygen mixtures containing from 25 to 50 (mole percent) oxygen, and preferably from 30 to 40 (mole percent) oxygen based on the steam-oxygen mixture. Many factors such as fuel compositions and relative proportions of coal and steam influence the amount of oxygen required. With constant steam and coal flows, an increase in oxygen over that stoichiometrically required decreases the hydrocarbon leakage, increases the furnace temperature and reduces the $H_2/CO$ ratio in the product gas. It has likewise been found that loss of heat through combustion chamber walls increases inordinately the excess oxygen requirement, and conversely preheating the inlet gas and powdered fuel decreases the oxygen requirement for maintaining the hydrocarbon leakage essentially at zero.

If steam is to be used to quench the product gas and increase the $H_2/CO$ ratio, it is preferably used in a steam to coal weight ratio ranging between 0.1 to about 1.0, and preferably between 0.2 and 0.5. This will decrease the furnace temperature at the point of steam addition, and likewise produce a gas containing a higher ratio of hydrogen to carbon monoxide.

The product gas obtained by the partial oxidation of the pulverized fuel may be used directly after its withdrawal from the gas cooler 16, or may be further treated in order to prepare it for use in the synthesis of methanol, in which a gaseous mixture of carbon monoxide and hydrogen is used; or to prepare it for use in the synthesis of ammonia, in which a gaseous mixture of carbon monoxide and hydrogen is used; or to prepare it for use in the synthesis of ammonia, in which a gaseous mixture of nitrogen and hydrogen is used; or to prepare it for use as a hydrogenation gas in which only its hydrogen content is used. Known methods may be used for treating the gaseous mixtures to give such synthesis gas mixtures or a process used such as that described in the copending application of L. C. Peery and R. H. McKane, S. N. 37,614, filed July 8, 1948 and now abandoned.

I claim:

1. In a continuous process for the preparation of carbon monoxide and hydrogen, by the partial combustion with an oxidizing gas containing at least 90% oxygen of pulverized coal at a temperature sufficient to melt the ash to molten slag, conducted in a vertically disposed cylindrical combustion zone, the steps which comprise premixing the pulverized coal, steam and an oxidizing gas containing at least 90% oxygen by a two-step process, in the first step of which the pulverized coal is premixed with steam and in the second step of which the two-component mixture of the first step is mixed with substantially 90% oxygen, passing the resulting mixture through a plurality of opposed burners situated in a plane to which the axis of the zone is substantially perpendicular, intersecting the flames from the burners within the combustion zone and substantially in the plane of the burners, discharging the slag in a molten state from the combustion zone, passing a portion of the gaseous products of combustion from the zone with the slag, effecting the intersection of the flames above and in proximity to the slag as it is discharged from the zone, and maintaining the molten slag in a free-flowing state during its discharge by direct heat exchange with the intersecting flames and by direct heat exchange with the gaseous products being discharged with the slag.

2. In a continuous process for the preparation of carbon monoxide and hydrogen, by the partial oxidation with an oxidizing gas containing at least 90% oxygen of comminuted carbonaceous material at a temperature sufficient to melt the ash to molten slag, the steps which comprise partially oxidizing the carbonaceous material in a combustion zone to carbon monoxide and hydrogen by the high oxygen containing oxidizing gas in the presence of steam, the combustion mixture being prepared by a two-step process, in the first step of which the carbonaceous material is mixed with steam and in the second step of which the two-component mixture of the first step is mixed with oxygen of at least 90% purity, directing the flame of the exothermic reaction in proximity to the molten slag as it flows from the combustion zone, maintaining the slag in a free flowing state by heat from the flame and by the discharge of from 10 to 25% of the gaseous combustion products with the slag from the reaction zone, and preventing material erosion of the combustion zone over which the slag flows from the combustion zone by proximate contact of the flame with the slag as it flows from substantially the center of that zone.

3. In a continuous process for the preparation of carbon monoxide and hydrogen, by the partial combustion with an oxidizing gas containing at least 95% oxygen of pulverized coal at a temperature sufficient to melt the ash to molten slag, the steps which comprise partially oxidizing the pulverized coal in a combustion zone to carbon monoxide and hydrogen by the high oxygen containing oxidizing gas in the presence of steam, the combustion mixture being prepared by a two-step process, in the first step of which the pulverized coal is mixed with steam and in the second step of which the two-component mixture of the first step is mixed with oxygen of at least 95% purity, directing the flame of the exothermic reaction from a plurality of burners disposed in a substantially horizontal plane and in proximity to the molten slag as it flows from the combustion zone, maintaining the slag in a free flowing state by heat from the flame and by the discharge of from 10 to 25% of the gaseous combustion products with the slag from the reaction zone, and preventing material erosion of the combustion zone over which the slag flows from the combustion zone by proximate contact of the flame with the slag as it flows from that zone.

4. In a continuous process for the preparation of carbon monoxide and hydrogen, by the partial combustion with an oxidizing gas containing at least 95% oxygen of pulverized coal at a temperature sufficient to melt the ash to molten slag, the steps which comprise conducting the partial oxidation after premixing the pulverized coal, steam and substantially 95% oxygen by a two-step process, in the first step of which the pulverized coal and steam are mixed and in the second step of which the two-component mixture of the first step is mixed with substantially 95% oxygen, passing the resulting mixture of pulverized coal, steam and oxidizing gas through a plurality of opposed burners, positioning the apex of the intersecting flames of the exothermic reaction from the opposed burners in sufficient proximity to the molten slag as it flows from the combustion zone to maintain the slag in a free flowing state, with the aid of heat from a portion of the gaseous combustion products also flowing with the slag from that zone.

5. In a continuous process for the preparation of carbon monoxide and hydrogen by the partial combustion of pulverized coal with oxygen of at least 90% purity and at a temperature sufficient to produce a molten slag, the steps which comprise premixing pulverized coal, steam and oxygen in a two-step process, in the first step of which pulverized coal and steam are mixed and in the second step of which the two-component mixture of the first step is combined with substantially 90% oxygen, passing the three-component mixture of pulverized coal, steam and substantially pure oxygen through a plurality of burners having greater length than cross-section, the three-components being mixed in an unburned state while passing through said burners, injecting the three-component mixture from the burners into the combustion zone wherein they are subjected to partial combustion temperatures and intersecting the resulting flames at a position above and in proximity to the slag as the slag flows from the combustion zone, discharging from about 10 to about 25% of the gaseous combustion products from the combustion zone with the molten slag, the intersection of the flames being so adjusted and arranged that the slag is maintained, with the heat from the discharged gaseous combustion products, in a molten, free-flowing state and is continuously discharged from the combustion zone in that state.

References Cited in the file of this patent

UNITED STATES PATENTS

| 2,058,051 | Bailey | Oct. 20, 1936 |
| 2,516,141 | Newman et al. | July 25, 1950 |
| 2,558,746 | Gaucher | July 3, 1951 |
| 2,655,443 | Moore | Oct. 13, 1953 |

OTHER REFERENCES

Newman: "Industrial and Engineering Chemistry," volume 40, No. 4, pages 567–570 (1948).